Aug. 2, 1932.  S. J. BENS  1,870,165
CHAIN OR LINK BELT
Filed Aug. 3, 1928
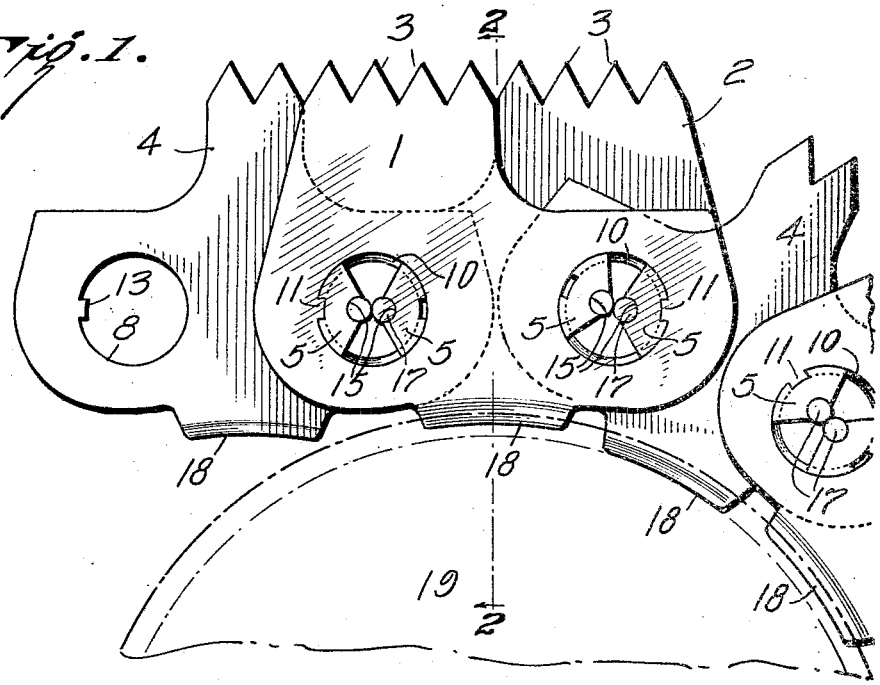
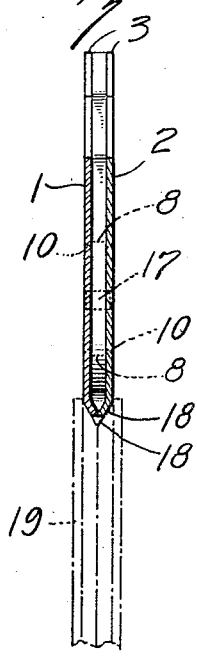
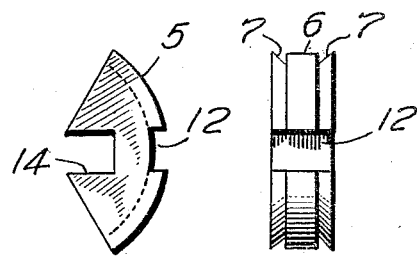
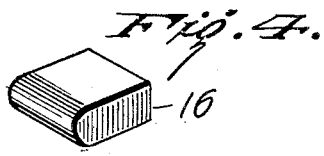
Inventor
SAMUEL J. BENS,
Attorneys Patented Aug. 2, 1932

1,870,165

UNITED STATES PATENT OFFICE

SAMUEL J. BENS, OF NEW YORK, N. Y., ASSIGNOR TO CHAIN SAW CORPORATION, OF NEW YORK, N. Y., A CORPORATION OF NEW YORK

CHAIN OR LINK BELT

Application filed August 3, 1928. Serial No. 297,185.

This invention relates to a chain or link belt composed of a plurality of overlapping individual links, pivoted together at their overlapping portions.

The principal object of the invention is the provision of such a joint between links that when the belt or chain passes around a pulley or sheave, friction and wear between the parts will be reduced to a minimum.

To this end the invention contemplates the provision of individual links having overlapping ends and aligning apertures therein. In these apertures, there are located opposed segments, each less than 180° in extent and suitably interlocked with the edges of the aperture and the respective links. Each segment is provided with a key directly opposed to and engaging a similar key in the neighboring segment. These keys may advantageously be located within correspondingly shaped recesses in the respective segments and held securely therein as by heading the segment over the key ends.

It is contemplated that these keys be made of hardened material with rounded faces engaging each other. The segments are locked to the links so that each segment will rock with its link as that link moves out of a straight line, and for instance when passing around a pulley. During this action, the entire pull of the assembled chain will be borne by the key faces. This being essentially a line contact, friction and therefore wear will be reduced to a minimum.

The invention further comprises the novel arrangement, combination and construction of parts more fully hereinafter described and shown in the drawing.

In the drawing:

Figure 1 is a plan view of a chain or belt embodying my invention.

Fig. 2 is a sectional view along the line 2—2 of Fig. 1.

Fig. 3 is a composite detail of a segment.

Fig. 4 is a perspective of one form of key.

Fig. 5 is a similar view of a modified form of key.

Referring now to the embodiment illustrated, I have shown the invention as applied to a chain saw or link belt. While the individual links appear with saw teeth, yet obviously the presence of the teeth is not essential.

There is illustrated at 1 and 2, cutter links carrying teeth 3, having located between their ends a drag link 4. Apertures in the end of each of the three links coincide.

The three links are pivotally secured together by two segments 5, the curved periphery of which comprises a partial cylindrical surface 6 and a partial frusto-conical surface 7 on each side thereof. The aperture in the drag link 4 has a cylindrical wall 8 adapted to contact with the segment surface 6, while the apertures in each of the cutter links 1 and 2 have flaring or frusto-conical walls 10 adapted to contact with the surfaces 7 of the segments. The frusto-conical surface 10 of each of the cutter links is broken by an offset lug 11 which seats in a recess 12 in the curved periphery of one of the segments. The surface 8 of the drag link is provided with an offset 13 which seats in the recess 12 in the other segments. Thus one segment is tied to and moves as an integral part of the cutter links and the other in like manner with the drag link.

Each of the segments is provided with a key socket, shown at 14 in Fig. 3 and at 15 in Fig. 1. In the first instance, the socket is to receive the key 16 of Fig. 4, and in the latter case, the key 17 of Fig. 5.

These keys may preferably be made of hardened material and are of such a size that when seated in their respective sockets, their curved surfaces will engage each other in substantially a line contact.

It will be apparent that the keys when in place prevent the segments from being withdrawn, due to the fact that each segment is interlocked with the aperture walls of the links.

The fact that the keys contact on substantially a line only, necessarily decreases friction and consequently wear, inasmuch as the entire pull between links is borne by this line contact.

The thickness of the key through the links is slightly less than the thickness of the segment, so that by upsetting the segment over the edge of the key, the latter will be effectively secured against accidental displacement.

The links are provided, between their apertures, with extensions 18 which are adapted to engage the sheave 19 in a frictional manner, this constituting the drive connection between chain and sheave.

I claim:

1. A chain comprising a pair of links, a third link having its end enclosed between the ends of the first two, said links having aligning apertures in their overlapped ends, two segments each of the full thickness of the three links disposed within and engaging the walls of the aligning apertures of the three links, and a pair of keys one inserted in each segment and engaging each other on a line contact.

2. A chain comprising a pair of links, a third link enclosed between the ends of the pair, a flaring walled aperture in the end of each of the pair, a cylindrically walled aperture in the end of the third link, and apertures being in alignment, two segments in the aligned apertures each having surfaces engaging the walls of the apertures in each link and a pair of keys one in each segment, adapted to rock on each other, one segment being secured to the pair of links, the other segment being secured to the third link.

3. A chain comprising a pair of links, a third link enclosed between the ends of the pair, a flaring walled aperture in the end of each of the pair, a cylindrically walled aperture in the end of the third link, and apertures being in alignment, two segments in the aligned apertures each having surfaces engaging the walls of the apertures in each link and a pair of keys one in each segment, adapted to rock on each other, a recess in one segment engaging offsets in the pair of links and a recess in the other segment engaging an offset in the third link.

4. A chain comprising links having overlapping ends, said ends being provided with aligning apertures, two segments located in the aligning apertures, said segments approaching each other centrally of the apertures and said segments having oppositely facing recesses in their juxtaposed parts, one recess in each segment, keys one in each recess and rockably engaging each other in a line contact, and means interlocking each of said segments with a link for movement therewith, when said keys are in place.

5. A chain according to claim 4 in which said links comprise a pair of links, a third link having its end enclosed between the ends of the pair, said aligning apertures comprising a flaring walled aperture in the end of each of the pair and a cylindrically walled aperture in the end of the third link, said segments each having flaring and cylindrical surfaces engaging the walls of the apertures in each link, one segment having a recess engaging projections from the flared walls of the pair of links and the other segment having a recess engaging a projection from the cylindrical wall of the third link.

6. A chain comprising links in pairs and a link connecting the pairs, bearing segments in aligning openings in the links, said openings having projections to engage notches in the segments, said segments having each a central cylindrical bearing surface and an outwardly flaring bearing surface at each side thereof, said central bearing surface engaging the connecting link and the flaring surfaces engaging the links of the pair, substantially as described.

7. A chain link according to claim 6 in which the notches in the segments extend continuously across the cylindrical and flaring bearing surfaces of the segments, and in which the diameter of the cylindrical surface is substantially equal to the diameter of the flaring surfaces, whereby bearing grooves for the said pair of links are formed between said cylindrical and flaring surfaces, substantially as described.

In testimony whereof, I affix my signature.

SAMUEL J. BENS.